(12) United States Patent
Findeisen et al.

(10) Patent No.: US 11,014,429 B2
(45) Date of Patent: May 25, 2021

(54) OPERATING DEVICE FOR AN AUTOMATIC CLIMATE CONTROL OF A MOTOR VEHICLE, AUTOMATIC CLIMATE CONTROL AS WELL AS MOTOR VEHICLE

(71) Applicant: VALEO Schalter und Sensoren GmbH, Bietigheim-Bissingen (DE)

(72) Inventors: Thomas Findeisen, Coburg (DE); Otto Mueller, Sesslach (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 242 days.

(21) Appl. No.: 16/307,284

(22) PCT Filed: Jun. 2, 2017

(86) PCT No.: PCT/EP2017/063478
§ 371 (c)(1),
(2) Date: Dec. 5, 2018

(87) PCT Pub. No.: WO2017/211720
PCT Pub. Date: Dec. 14, 2017

(65) Prior Publication Data
US 2019/0135074 A1 May 9, 2019

(30) Foreign Application Priority Data
Jun. 7, 2016 (DE) .......................... 10 2016 110 458.2

(51) Int. Cl.
*B60H 1/00* (2006.01)
*G01K 1/20* (2006.01)

(52) U.S. Cl.
CPC ..... *B60H 1/00792* (2013.01); *B60H 1/00807* (2013.01); *G01K 1/20* (2013.01); *G01K 2201/02* (2013.01)

(58) Field of Classification Search
CPC .............. B60H 1/00792; B60H 1/0075; B60H 1/00807; G01K 1/20; G01K 2201/02
See application file for complete search history.

(56) References Cited

U.S. PATENT DOCUMENTS 8,651,735 B2 * 2/2014 Regensburger .......... G01K 1/20
374/141

FOREIGN PATENT DOCUMENTS

DE 19842895 A1 3/2000
DE 10056692 A1 * 5/2002 ......... B60H 1/00792
(Continued)

OTHER PUBLICATIONS

DE-10056692-A1 English translation (Year: 2002).*
(Continued)

*Primary Examiner* — Marc E Norman
*Assistant Examiner* — Schyler S Sanks
(74) *Attorney, Agent, or Firm* — Osha Bergman Watanabe & Burton LLP

(57) ABSTRACT

The invention relates to an operating device (5) for an automatic climate control (2) of a motor vehicle (1) including a sensor assembly (7) for determining an interior temperature in a passenger cabin (4) of the motor vehicle (1) and including an operating area (8), wherein the sensor assembly (7) comprises a circuit board (11) and a sensor unit (12) disposed on the circuit board (11) with a first temperature sensor (17), and wherein a top side (9) of the operating area (8) faces the passenger cabin (4) in an intended installation position of the operating device (5) on the motor vehicle (1). In addition, the invention relates to an automatic climate control (2) as well as to a motor vehicle (1).

13 Claims, 2 Drawing Sheets

(56) References Cited

FOREIGN PATENT DOCUMENTS

Figure 1:
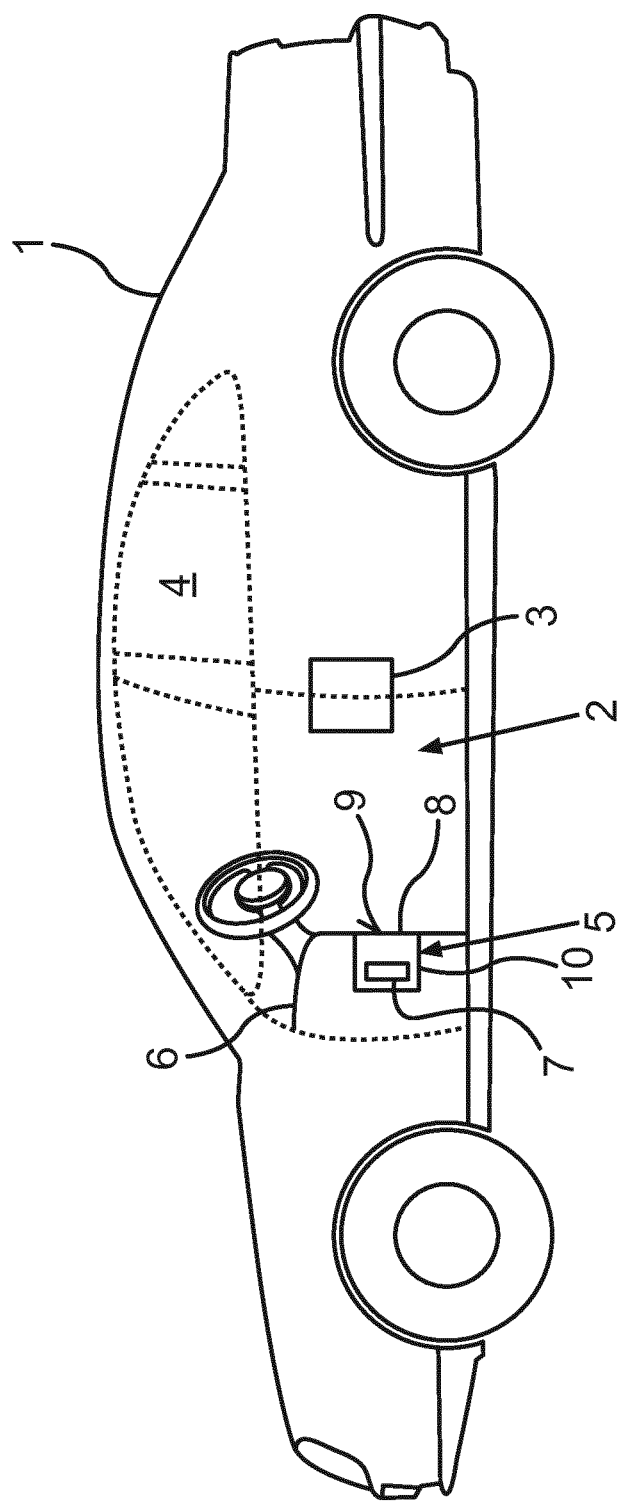

| | | |
|---|---|---|
| DE | 10056693 A1 | 5/2002 |
| DE | 102004009605 A1 | 9/2005 |
| DE | 102006040664 A1 | 3/2008 |
| DE | 102007043424 A1 | 3/2009 |
| EP | 0987133 A2 | 3/2000 |
| EP | 1195275 A2 | 4/2002 |
| EP | 1894757 A1 | 3/2008 |
| FR | 2912503 A1 | 8/2008 |
| JP | 2005075165 A | 3/2005 |

OTHER PUBLICATIONS

International Search Report and Written Opinion Issued in Corresponding PCT Application No. PCT/EP2017/063478, dated Aug. 14, 2017 (9 Pages).

German Search Report Issued in Corresponding German Application No. 102016110458.2, dated Nov. 27, 2017 (6 Pages).

* cited by examiner

OPERATING DEVICE FOR AN AUTOMATIC CLIMATE CONTROL OF A MOTOR VEHICLE, AUTOMATIC CLIMATE CONTROL AS WELL AS MOTOR VEHICLE

The invention relates to an operating device for an automatic climate control of a motor vehicle including a sensor assembly for acquiring an interior temperature in a passenger cabin of the motor vehicle and including an operating area, wherein the sensor assembly comprises a circuit board and a sensor unit disposed on the circuit board with a first temperature sensor, and wherein a top side of the operating area faces the passenger cabin in an intended installation position of the operating device on the motor vehicle. In addition, the invention relates to an automatic climate control for a motor vehicle with such an operating device as well as to a motor vehicle with an automatic climate control.

Presently, the interest is directed to air conditioning systems for motor vehicles, which in particular automatically control an interior temperature in a passenger cabin of the motor vehicle. Therein, a desired temperature value is usually preset by a vehicle occupant of the motor vehicle via an operating device of the automatic climate control, to which the interior temperature is then automatically adjusted by the automatic climate control. Thereto, air conditioning systems are known from the prior art, which determine the current interior temperature of the vehicle via a temperature sensor. The temperature sensor can determine the temperature of an airflow in a channel, wherein the airflow in the channel is generated by a ventilation motor. For avoiding the expensive ventilation motor, it is known from the prior art to use unvented devices for determining the interior temperature.

Thereto, for example DE 10 2006 040 664 A1 describes a device for determining a passenger cabin temperature value by means of two temperature sensors, wherein one of the two temperature sensor is therein disposed at a surface element of a dashboard and the other temperature sensor is disposed in a volume adjoining to the passenger cabin. Thus, the other temperature sensor is installed visibly for vehicle occupants in the passenger cabin, which can for example be disadvantageous for design and constructional reasons.

DE 10 2004 009 605 A1 too, describes a temperature sensor and an assembly for climate control of a motor vehicle interior. Therein, the first temperature sensor is disposed in an opening of a front panel in the motor vehicle. There also result restrictions in the configuration of the operating area since openings or apertures have to be provided in the operating area.

It is the object of the present invention to provide a particularly inexpensive operating device simply to be manufactured for an automatic climate control of a motor vehicle.

According to the invention, this object is solved by an operating device, an automatic climate control as well as a motor vehicle according to the respective independent claims. Advantageous embodiments of the invention are the subject matter of the dependent claims, of the description as well as of the figures.

According to an embodiment of an operating device for an automatic climate control of a motor vehicle, it can have a sensor assembly for acquiring an interior temperature in a passenger cabin of the motor vehicle as well as an operating area. In particular, the sensor assembly therein includes a circuit board and a sensor unit disposed on the circuit board with a first temperature sensor. Moreover, a top side of the operating area can face the passenger cabin in an intended installation position of the operating device on the motor vehicle. In addition, a bottom side of the operating area opposing the top side is in particular disposed spaced from the sensor unit disposed on the circuit board and formed completely covering the sensor unit, and the first temperature sensor is adapted to contactlessly acquire a first surface temperature of a surface element of the operating area, depending on which the interior temperature can be determined.

In a preferred embodiment of the operating device for an automatic climate control of a motor vehicle, this operating device has a sensor assembly for acquiring an interior temperature in a passenger cabin of the motor vehicle and an operating area. The sensor assembly includes a circuit board and a sensor unit disposed on the circuit board with a first temperature sensor. A top side of the operating area faces the passenger cabin in an intended installation position of the operating device on the motor vehicle. Moreover, a bottom side of the operating area opposing the top side is disposed spaced from the sensor unit disposed on the circuit board and formed completely covering the sensor unit. The first temperature sensor is adapted to contactlessly acquire a first surface temperature of a surface element of the operating area, depending on which the interior temperature can be determined.

By means of the operating device, via which for example a driver of the motor vehicle can preset a desired temperature for the interior or the passenger cabin of the motor vehicle, the interior temperature can be adjusted or controlled to the desired temperature preset by the driver. Thereto, the operating area formed adjoining to the passenger cabin in the installed state of the operating device can have operating elements for acquiring the operating input of the driver. In addition, the operating device includes the sensor assembly, which is able to determine the current interior temperature in the passenger cabin. In the intended installation position, the sensor assembly is disposed below the operating area viewed from the vehicle interior with an observer looking to the top side of the operating area. Thus, the sensor assembly can in particular be invisibly installed on the motor vehicle such that only the top side or front side of the operating area is visible in the intended installation position of the operating device in the motor vehicle. For example, the operating area can be formed as a design surface or faceplate, which can be disposed in a dashboard and/or a center console in the passenger cabin.

The sensor assembly includes the circuit board or board, via which the sensor unit and further electronic components of the sensor assembly, for example a control and evaluation unit of the operating device, can be electrically contacted. Thereto, the sensor unit is in particular disposed on a top side of the circuit board, wherein the top side of the circuit board is disposed spaced from the bottom side or rear side of the operating area. Therein, the operating area is formed such that it at least completely covers or overlaps the sensor unit. Therein, by the operating area completely covering the sensor unit, an operating area closed in a covering area or overlap area between the sensor unit and the operating area, without aperture or opening, is to be understood.

For determining the interior temperature, now, the first temperature sensor is provided, which in particular does not directly acquire the interior temperature, but the first surface temperature of the surface element of the operating area. Therein, the surface element of the operating area is located within the covering area or overlap area of sensor unit and operating area. Based on the board, thus, the surface element is spaced and in particular directly above the first temperature sensor. In order to be able to reliably acquire the surface temperature in the spaced arrangement of first temperature sensor and surface element, the first temperature sensor is configured for contactless or non-contact surface temperature acquisition.

Thus, the invention has the advantage that the entire operating device can be more inexpensively and simply configured by the integration of the first temperature sensor contactlessly acquiring the temperature on the circuit board and thereby the arrangement of the first temperature sensor behind the operating area, since an aperture or an opening is not required in the operating area. Advantageously, the surface of the operating area is arbitrarily formable since the first temperature sensor does not have any influence on the design of the operating area or the operating part.

Preferably, the operating device has an evaluation unit, which is adapted to determine the interior temperature in the passenger cabin of the motor vehicle depending on the first surface temperature. Therein, in the simplest case, the first surface temperature acquired by the first temperature sensor can be assumed as the interior temperature. However, it can also be provided that further temperature values, which are for example acquired by other sensors in other positions within the passenger cabin, enter in the determination of the current interior temperature. The evaluation unit can also be disposed on the circuit board. However, it can also be provided that the evaluation unit is associated with the operating device and for example is integrated in a vehicle-side control unit. In this case, the operating device is in particular adapted to communicate with the vehicle-side control unit or the vehicle-side control device.

Particularly preferably, the first temperature sensor is formed as an infrared sensor, which is adapted to determine the first surface temperature based on infrared radiation incident on the infrared sensor from the surface element. Thus, the contactless temperature measurement is provided by the infrared sensor in particular capturing radiation power of the infrared radiation and determining the surface temperature from the radiation power based on the radiation power in a manner known per se. By means of the infrared sensor, the first surface temperature can be measured in particularly reliable manner also without direct thermal coupling, thus in contactless manner.

According to a development of the invention, the sensor unit has a second temperature sensor for measuring a clearance temperature in a clearance between the sensor unit and the bottom side of the operating area facing the sensor unit. In particular, the second temperature sensor is formed as a thermistor, preferably as a Negative Temperature Coefficient Thermistor or NTC resistor. Thus, the second temperature sensor measures the temperature in particular not in contactless manner. The second temperature sensor formed as a thermistor, the electrical resistance of which depends on the temperature in the clearance, can acquire the clearance temperature, in particular the temperature of the volume adjoining to the second temperature sensor.

By means of the second temperature sensor, in particular heating of the operating area due to solar radiation on the top side of the operating area is to be acquired. Namely, this heating of the operating area results in an increasing surface temperature of the operating area, which is acquired by the first temperature sensor, but which does not reflect the current interior temperature. In order to prevent erroneous control of the interior temperature, the clearance temperature is additionally acquired below the operating area, which is at least less influenced by the solar radiation. By means of the clearance temperature, thus, the surface temperature acquired by the first temperature sensor can be made plausible.

Thereto, an evaluation unit of the operating device is preferably adapted to acquire the heating of the operating area due to solar radiation on the top side of the operating area based on a comparison of the first surface temperature and the clearance temperature. In particular, the heating of the operating area and thereby the presence of in particular direct solar radiation on the top side of the operating area is acquired if a difference of the first surface temperature and the clearance temperature exceeds a predetermined threshold value. This heating of the operating area can then be taken into account by the evaluation unit in determining the actual, current interior temperature in the passenger cabin. By means of the operating device, thus, the interior temperature can be particularly reliably determined and thus correct control of the interior temperature can be provided by the automatic climate control.

In a particularly advantageous development of the invention, the sensor unit has a third temperature sensor for contactless surface temperature measurement. In addition, in a clearance between the sensor unit and the bottom side of the operating area facing the sensor unit, a planar measuring part is disposed, wherein the third temperature sensor is adapted to contactlessly acquire a second surface temperature of a surface of the planar measuring part. This means that the planar measuring part, which is formed as a concrete element, is disposed in the clearance. Therein, the measuring part is in particular disposed spaced from the bottom side of the operating area as well as spaced from the sensor unit and can for example be formed of the same material as the operating area. For example, measuring part and operating area can be formed of a plastic. For example, the measuring part can be centrally disposed within the clearance, thus, at half height of the clearance.

An area of the measuring part in particular extends parallel to the operating area, wherein the area of the measuring part is in particular formed in a size, by which only the measuring part as well as the third temperature sensor overlap. In particular, the measuring part does not overlap with the first temperature sensor and the second temperature sensor. This third temperature sensor is preferably again formed as an infrared sensor, which is adapted to determine the second surface temperature based on infrared radiation incident on the infrared sensor from the surface of the measuring part. By means of the third temperature sensor, a differential measurement approach between the first and the third temperature sensor can be allowed. By means of the second surface temperature acquired by the third temperature sensor, the heating of the operating area can also additionally be considered. Herein, the invention is based on the realization that the measuring part is not exposed to the direct solar radiation in contrast to the operating area since the measuring part is covered by the operating area. Thus, the first surface temperature acquired by the first temperature sensor can also be made plausible based on the second surface temperature acquired by the third temperature sensor.

Therein, an evaluation unit of the operating device is adapted to determine a differential surface temperature based on the first and the second surface temperature and to determine the interior temperature in the passenger cabin depending on the differential surface temperature. From a difference of the surface temperatures deviating from zero, thus from a gradient in the surface temperatures, energy flows or a convection between the passenger cabin as well as the clearance between the circuit board and the operating area result. Based on the differential surface temperature, thus, evaluation of the energy flows or convection can advantageously be allowed.

Therein, it can be provided that the top side and/or the bottom side of the operating area have a ribbed structure at least within the surface element. The ribbed structure can for example be formed of plastic. In particular, the operating area can have the ribbed structure or ribs only in the overlap area with the sensor unit. Alternatively or additionally, a surface of the measuring part can have the ribbed structure. The ribbed structure allows particularly exact surface temperature acquisition.

In a configuration of the invention, a region of the circuit board surrounding the sensor unit is mechanically connected to the bottom side of the operating area such that a duct for thermal decoupling is formed in an overlap area between the bottom side of the operating area and the sensor unit. For example, the region surrounding the duct between the circuit board and the bottom side of the operating area can be filled with a potting compound such that a layered structure having the circuit board, the potting compound as well as the operating area results in the area outside of the duct along a longitudinal axis of the operating device. The operating device is therefore particularly stably configured. The overlap area of the operating area is thermally decoupled from the sensor unit by the duct, which is for example filled with air.

In a development of the invention, the operating device has a housing surrounding the sensor assembly, wherein a housing lid of the housing forms the operating area. Thus, the sensor assembly is disposed within the housing, wherein a top side or front side of the housing lid is formed adjoining to the passenger cabin and thereby forms the operating area in an intended installation position of the operating device in the motor vehicle. For example, the front side of the housing lid can be coated and thus be adapted to the design of the installation location, for example in the center console.

In addition, the invention relates to an automatic climate control for a motor vehicle having an operating device according to the invention and a control device for controlling the interior temperature in the passenger cabin depending on the interior temperature determined by the operating device. By means of the operating device, the desired temperature for the interior can for example be adjusted by the driver of the motor vehicle, wherein the control device adjusts the interior temperature to the desired temperature considering the current interior temperature acquired by the sensor assembly. The operating device can for example have operating elements at the top side of the operating area, by means of which the driver can perform an operating input for presetting the desired temperature.

A motor vehicle according to the invention includes an automatic climate control according to the invention. Therein, the operating device of the automatic climate control is disposed on the motor vehicle such that the top side of the operating area faces the passenger cabin and the sensor assembly is installed invisibly and spaced from the bottom side of the operating area facing away from the passenger cabin.

The preferred embodiments presented with respect to the operating device according to the invention and the advantages thereof correspondingly apply to the automatic climate control according to the invention as well as to the motor vehicle according to the invention.

With indications of "over", "below", "in front of", "behind", "top side", "bottom side", "front side", "rear side" etc., the positions and orientations given with intended use and intended arrangement of the operating device in the motor vehicle and with an observer located in the passenger cabin of the motor vehicle and looking towards the operating device are specified.

Further features of the invention are apparent from the claims, the figures and the description of figures. The features and feature combinations mentioned above in the description as well as the features and feature combinations mentioned below in the description of figures and/or shown in the figures alone are usable not only in the respectively specified combination, but also in other combinations or alone without departing from the scope of the invention. Thus, implementations are also to be considered as encompassed and disclosed by the invention, which are not explicitly shown in the figures and explained, but arise from and can be generated by separated feature combinations from the explained implementations. Implementations and feature combinations are also to be considered as disclosed, which thus do not have all of the features of an originally formulated independent claim. Moreover, implementations and feature combinations are to be considered as disclosed, in particular by the implementations set out above, which extend beyond or de-viate from the feature combinations set out in the relations of the claims.

Now, the invention is explained in more detail based on preferred embodiments as well as with reference to the attached drawings.

Figure 2:
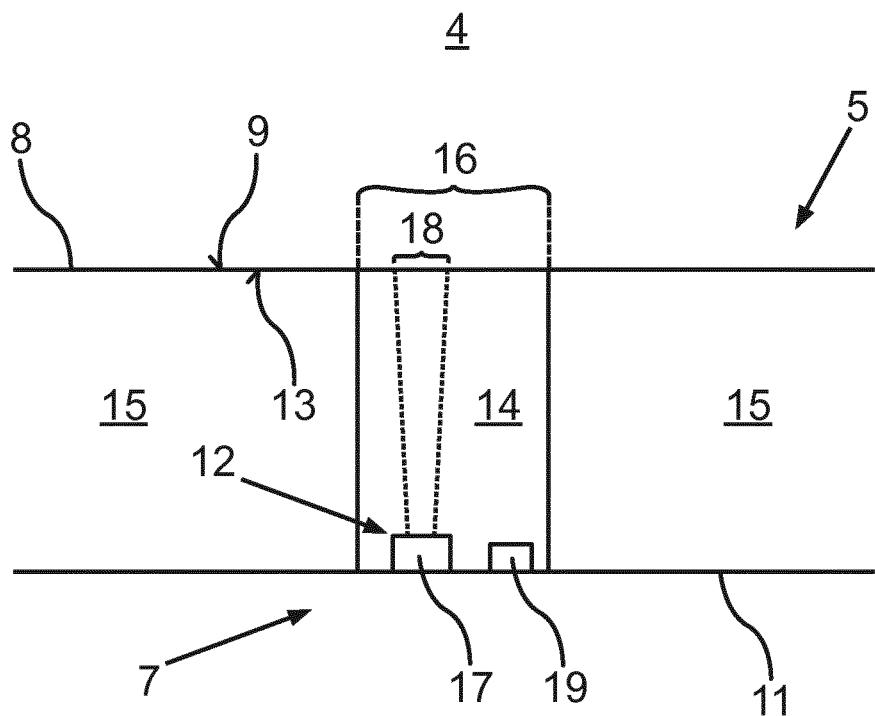
Figure 3:
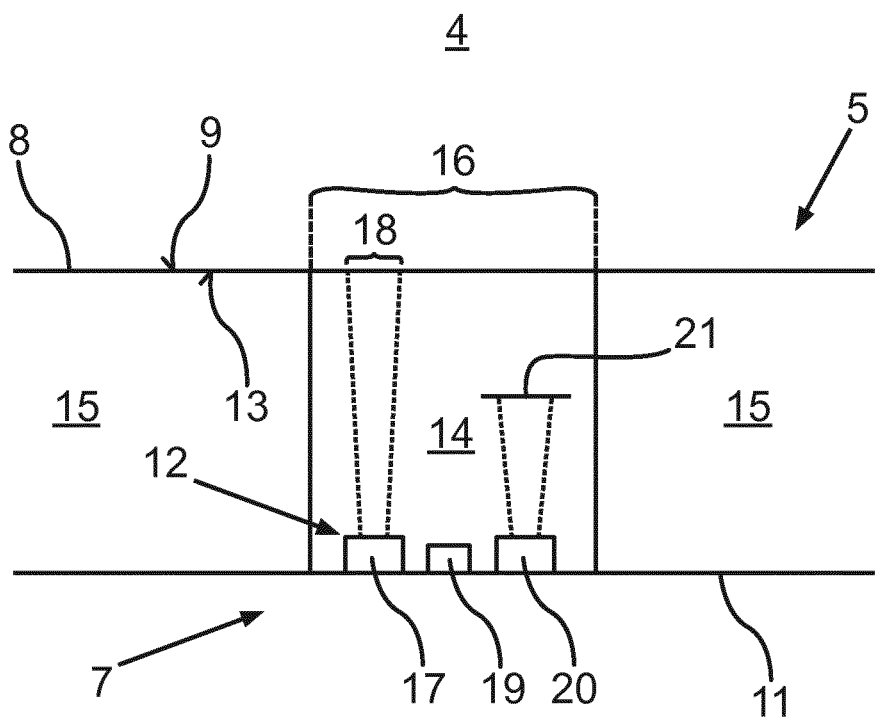

There show:

FIG. 1 a schematic representation of an embodiment of a motor vehicle according to the invention;

FIG. 2 a schematic representation of an embodiment of an operating device according to the invention; and FIG. 3 a schematic representation of a further embodiment of an operating device according to the invention.

In the figures, identical as well as functionally identical elements are provided with the same reference characters.

FIG. 1 shows a motor vehicle 1 according to the present invention. In particular, the motor vehicle 1 is formed as a passenger car. The motor vehicle 1 includes an automatic climate control 2 with a control device 3. The control device 3 can for example be integrated in a vehicle-side control unit and serves for controlling an interior temperature in an interior or a passenger cabin 4 of the motor vehicle 1. Thereto, the automatic climate control 2 additionally has an operating device 5, which can for example be integrated in a dashboard 6 and/or a center console of the motor vehicle 1 not shown here. The operating device 5 serves for determining a current interior temperature in the passenger cabin 4 among other things. Thereto, the operating device 5 has a sensor assembly 7, which is disposed behind an operating area 8 of the operating device 5.

In an intended installation position of the operating device 5 in the passenger cabin 4, a top side 9 or front side of the operating area 8 faces the passenger cabin 4. Looking from the passenger cabin 4 towards the top side 9, the sensor assembly 7 is disposed below the operating area 8 and spaced from the operating area 8. Therein, the sensor assembly 7 can be integrated in a housing 10 of the operating device 5, wherein a housing lid of the housing 10 forms the operating area 8. In addition, the operating area 8 can have operating elements not shown here, by means of which a driver of the motor vehicle 1 can preset a desired temperature for the passenger cabin 4. Thereupon, the control device 3 can adjust the interior temperature to the desired temperature adjusted by the driver depending on the interior temperature acquired by the sensor assembly 7.

An embodiment of the operating device 5 is schematically shown in FIG. 2 in a cross-section. Therein, the sensor assembly 7 has a circuit board 11, on which a sensor unit 12 is disposed. The sensor unit 12 is disposed spaced from the operating area 8, wherein a bottom side 13 of the operating area 8 opposing the top side 9 faces the sensor unit 12. Here, the sensor unit 12 is disposed within a duct 14, wherein a region 15 surrounding the duct 14 mechanically connects the circuit board 11 as well as the operating area 8. The region 15 can for example be formed as a potting compound, by which a stability of the operating device 5 can be increased. By the duct 14, the operating area 8 can be thermally decoupled from the sensor unit 12. Along an extension direction of the operating area 8 and the circuit board 11, the duct has a width, which extends at least over an overlap area 16 between the sensor unit 12 and the operating area 8. The operating area 8 completely covers the sensor unit 12 in the overlap area 16. This in particular means that the operating area 8 is formed as a closed area without opening in the overlap area 16.

In addition, the sensor unit 12 has a first temperature sensor 17, by means of which a first surface temperature of a surface element 18 of the operating area 8 can be acquired within the overlap area 16 in contactless or non-contact manner. Since the operating area 8 is formed closed or without opening at least in the overlap area 16, by the first temperature sensor 17, it is not directly determined the interior temperature in the passenger cabin 4, but the first surface temperature. The interior temperature in the passenger cabin 4 is then derived from the first surface temperature for example by an evaluation unit not shown here, which can for example also be disposed on the circuit board 11. For example, the evaluation unit can set the first surface temperature as the interior temperature.

In particular, the first temperature sensor 17 is formed as an infrared sensor, by means of which the first surface temperature can be determined based on infrared radiation incident on the infrared sensor 17 from the surface element 18. In addition, the sensor unit 12 here has a second temperature sensor 19 within the duct 14, which is able to acquire a clearance temperature within the duct 14. Therein, the second temperature sensor 19 in particular does not measure a surface temperature, but the temperature within a volume around the second temperature sensor 19. The second temperature sensor 19 is in particular formed as a thermistor, preferably as a high-temperature conductor or NTC resistor.

By means of the clearance temperature within the duct 14 acquired by the second temperature sensor 19, the surface temperature acquired by the first temperature sensor 17 can be made plausible. Namely, if solar radiation is incident on the top side 9 of the operating area 8 and thereby greatly heats the operating area 8, it can occur that the first surface temperature acquired by the first temperature sensor 17 does not reflect the current temperature in the interior 4 of the motor vehicle 1. This would result in false temperature determination by the operating device 5 and thereby in erroneous temperature control by the control device 3. If a difference between the first surface temperature acquired by the first temperature sensor 17 and the clearance temperature acquired by the second temperature sensor 19 exceeds a predetermined threshold value, thus, this indicates heating of the operating area 8 by solar radiation and can be taken into account in the determination of the interior temperature in the passenger cabin 4.

FIG. 3 shows a further embodiment of the operating device 5 according to the invention. Therein, the embodiment of the operating device 5 shown in FIG. 2 is extended by a further, third temperature sensor 20 adapted for contactless surface temperature acquisition according to FIG. 3. The third temperature sensor 20 can again be formed as an infrared sensor. The third temperature sensor 20 acquires a second surface temperature of a measuring part 21, which is here disposed centrally within the duct 14 along a longitudinal axis of the operating device 5. For example, the measuring part 21 can be formed of the same material as the operating area 8 and be attached to an edge of the duct 14. Therein, the measuring part 21 in particular overlaps only with the third temperature sensor 20. This third temperature sensor 20 measures the second surface temperature of the measuring part 21 based on the infrared radiation emitted from the measuring part 21.

Now, the evaluation unit of the operating device 5 can perform a differential temperature measurement by determining a difference between the first surface temperature acquired by the first temperature sensor 17 and the second surface temperature acquired by the third temperature sensor 20. Based on this difference, an energy flow evaluation or convection between the passenger cabin 4 and the duct 14 can be evaluated. Based on the differential temperature, it can also be evaluated if the operating area 8 is exposed to severe solar radiation, by which the operating area 8 is heated. In addition, the interior temperature in the passenger cabin 4 can be determined based on the differential surface temperature.

The invention claimed is:

1. An operating device for an automatic climate control of a motor vehicle comprising:
    a sensor assembly for determining an interior temperature in a passenger cabin of the motor vehicle; and
    an operating area,
    wherein the sensor assembly comprises:
        a circuit board, and
        a plurality of sensors disposed on the circuit board, the plurality of sensors comprising a first temperature sensor,
    wherein a top side of the operating area faces the passenger cabin in an installation position of the operating device on the motor vehicle,
    wherein a bottom side of the operating area opposing the top side is disposed spaced from the plurality of sensors disposed on the circuit board and completely covers the plurality of sensors, and
    wherein the first temperature sensor is adapted to contactlessly acquire a first surface temperature of a surface element of the operating area,
    wherein the interior temperature is determined based on the first surface temperature, and
    wherein a region of the circuit board surrounding the plurality of sensors is mechanically connected to the bottom side of the operating area such that a duct is formed for thermal decoupling in an overlap area between the bottom side of the operating area and the plurality of sensors.

2. The operating device according to claim 1, wherein the operating device comprises a controller, the controller being adapted to determine the interior temperature in the passenger cabin of the motor vehicle depending on the first surface temperature.

3. The operating device according to claim 1, wherein the first temperature sensor is an infrared sensor that determines the first surface temperature based on infrared radiation incident on the infrared sensor from the surface element.

4. The operating device according to claim 1, wherein the plurality of sensors comprises a second temperature sensor that measures a clearance temperature in a clearance between the plurality of sensors and the bottom side of the operating area facing the plurality of sensors.

5. The operating device according to claim 4, wherein the second temperature sensor is a thermistor.

6. The operating device according to claim 4, wherein the operating device comprises a controller that is adapted to capture heating of the operating area due to solar radiation on the top side of the operating area based on a comparison of the first surface temperature and the clearance temperature.

7. The operating device according to claim 4,
wherein the plurality of sensors comprises a third temperature sensor that performs a contactless surface temperature measurement and a flat measuring part that is disposed in the clearance between the plurality of sensors and the bottom side of the operating area, and
wherein the third temperature sensor contactlessly acquires a second surface temperature that is on a surface of the flat measuring part.

8. The operating device according to claim 7, wherein the third temperature sensor is an infrared sensor that determines the second surface temperature based on infrared radiation incident on the infrared sensor from the surface of the measuring part.

9. The operating device according to claim 7, wherein a controller is adapted to determine a differential surface temperature based on the first and the second surface temperature and to determine the interior temperature in the passenger cabin depending on the differential surface temperature.

10. The operating device according to claim 1, wherein the top side and/or the bottom side of the operating area comprise a ribbed structure in the surface element.

11. The operating device according to claim 1,
wherein the operating device comprises a housing surrounding the sensor assembly, and
wherein the housing comprises a housing lid that forms the operating area.

12. An automatic climate control for the motor vehicle comprising:
the operating device according to claim 1; and
a temperature controller that controls the interior temperature in the passenger cabin depending on the interior temperature determined by the operating device.

13. A motor vehicle with the automatic climate control according to claim 12, wherein the operating device of the automatic climate control is disposed on the motor vehicle such that the top side of the operating area faces the passenger cabin and the sensor assembly is installed such that it cannot be seen by an observer.

* * * * *